Figures 1, 2:
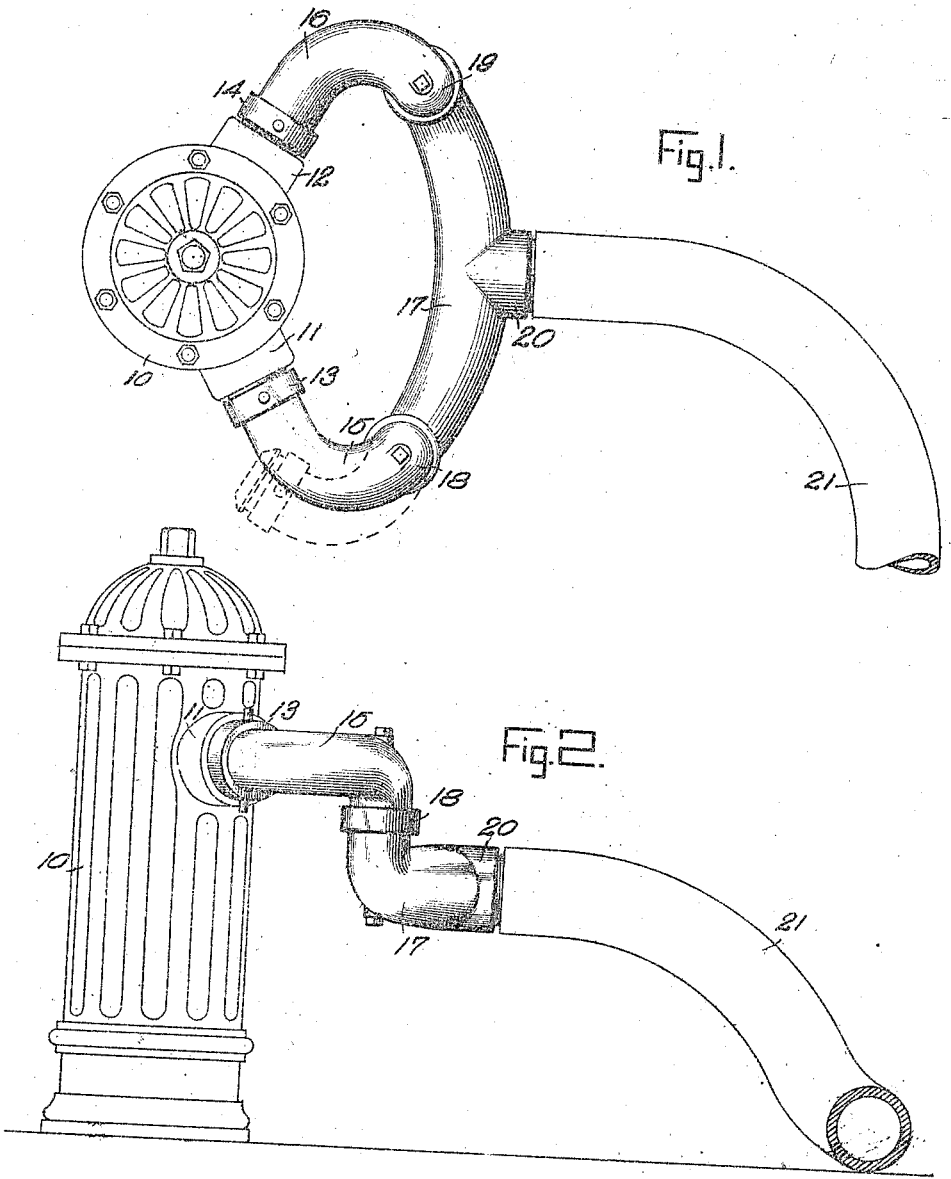

W. H. B. HALAHAN.
TWIN CONNECTION FOR FIRE HYDRANTS.
APPLICATION FILED DEC. 2, 1915.

1,192,622.

Patented July 25, 1916.

WITNESSES

INVENTOR
Wm. H. B. Halahan
BY
ATTORNEYS

UNITED STATES PATENT OFFICE.

WILLIAM H. B. HALAHAN, OF RYE, NEW YORK.

TWIN CONNECTION FOR FIRE-HYDRANTS.

1,192,622.
Specification of Letters Patent. Patented July 25, 1916.

Application filed December 2, 1915. Serial No. 64,705.

*To all whom it may concern:*

Be it known that I, WILLIAM H. B. HALAHAN, a citizen of the United States, and a resident of Rye, in the county of Westchester and State of New York, have invented a new and Improved Twin Connection for Fire-Hydrants, of which the following is a full, clear, and exact description.

The invention relates to the hose connection between a hydrant and a fire engine, and its object is to provide a new and improved twin connection arranged to supply practically double the amount of water from an ordinary hydrant to the pump of the fire engine.

In order to accomplish the desired result use is made of a suction hose provided at the hydrant end with branch pipes terminating in couplings adapted to be coupled to the usual two outlets of a fire hydrant, the hose being of a capacity to accommodate the water from both branch pipes.

A practical embodiment of the invention is represented in the accompanying drawings forming a part of this specification, in which similar characters of reference indicate corresponding parts in both views.

Figure 1 is a plan view of the improved twin connection attached to a hydrant; and Fig. 2 is a side elevation of the same.

A fire hydrant of usual construction is provided with two outlets 11 and 12 to which can be coupled by couplings 13 and 14 the ends 15 and 16 of branch pipes 17, the said ends 15 and 16 being preferably connected by swivel joints 18 and 19 with the branch pipes 17. The branch pipes 17 terminate in a nipple 20 attached to the suction end of the hose 21 adapted to be connected in the usual manner at the other end with the suction inlet of the pump of the fire engine. The ends 15 and 16 of the branch pipes 17 are approximately each two and a half inches in diameter to correspond to the outlets 11 and 12 of the fire hydrant 10, but the nipple 20 and the hose 21 are approximately of five inches in diameter so as to accommodate the water from both ends 15 and 16 of the branch pipes 17 thereby supplying the pumping engine with practically double the amount of water than is now usually obtained by the single connection of the suction hose with one of the outlets 11 and 12. The ends 15 and 16 of the branch pipes 17 are preferably swiveled to permit of readily connecting the couplings 13 and 14 with the outlets 11 and 12 extending at angles from the hydrant 10, as plainly indicated in Figs. 1 and 2. Thus, if there is a difference in the distance between the outlets 11 and 12 or the angularity thereof one relatively to the other is somewhat different from the normal then the ends 15 and 16 on account of being swiveled permit ready connection of the couplings 13 and 14 with the outlets 11 and 12.

Having thus described my invention, I claim as new and desire to secure by Letters Patent:

1. A twin connection for connecting a suction hose with a fire hydrant, comprising a branch pipe having a nipple for connecting a suction hose thereto and provided with swiveled ends having couplings for attaching them to the outlets of a fire hydrant, the nipple being of a diameter approximately double that of the swiveled ends of said pipe.

2. A twin connection for connecting a suction hose with a fire hydrant, consisting of a pipe having a centrally arranged nipple for connecting a suction hose thereto and provided with curved members swiveled to the ends thereof and having couplings for attaching them to a fire hydrant.

In testimony whereof I have signed my name to this specification in the presence of two subscribing witnesses.

WILLIAM H. B. HALAHAN. [L. S.]

Witnesses:
WM. H. SELZER,
JOSEPH J. HAAG.